(12) United States Patent
Ganta et al.

(10) Patent No.: US 8,371,863 B1
(45) Date of Patent: Feb. 12, 2013

(54) MODULAR WIRING SYSTEM

(75) Inventors: Sunil Ganta, Plainview, NY (US); Paul Endres, Plainview, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 0 days.

(21) Appl. No.: 13/194,898

(22) Filed: Jul. 29, 2011

(51) Int. Cl.
*H01R 4/66* (2006.01)

(52) U.S. Cl. ........................................ 439/107

(58) Field of Classification Search .............. 439/107, 439/135, 337, 345, 535, 656, 864
See application file for complete search history.

(56) References Cited

U.S. PATENT DOCUMENTS

| | | |
|---|---|---|
| 1,938,309 A | 12/1933 | Williams |
| 1,938,917 A | 12/1933 | Loetscher |
| 2,238,386 A | 4/1941 | Frank |
| 2,397,688 A | 4/1946 | Osinski |
| 2,399,688 A | 5/1946 | Metzner et al. |
| 2,433,917 A | 1/1948 | McCartney |
| 2,466,930 A | 4/1949 | Cook |
| 2,515,256 A | 7/1950 | O'Brien et al. |
| 2,644,144 A | 6/1953 | Richardson |
| 2,763,847 A | 9/1956 | Hubbell |
| 2,892,174 A | 6/1959 | Benander |
| 2,937,688 A | 5/1960 | Kirchner |
| 2,941,178 A | 6/1960 | Hubbell et al. |
| 2,969,518 A | 1/1961 | Slater |
| 2,985,334 A | 5/1961 | Slater |
| 3,002,175 A | 9/1961 | Bertram et al. |
| 3,023,394 A * | 2/1962 | Hubbell ................. 439/337 |
| 3,038,141 A | 6/1962 | Chiuchiolo |
| 3,120,987 A * | 2/1964 | Degnan et al. ........... 439/588 |
| 3,121,599 A | 2/1964 | Modrey |

(Continued)

FOREIGN PATENT DOCUMENTS

| | | |
|---|---|---|
| CA | 1182583 | 2/1985 |
| JP | 6014026 | 1/1994 |

(Continued)

OTHER PUBLICATIONS

International Search Report and the Written Opinion of the International Searching Authority mailed on May 7, 2008 for PCT/US2007/082460 filed on Oct. 25, 2007; 9 pages.

(Continued)

*Primary Examiner* — Amy Cohen Johnson
*Assistant Examiner* — Vladimir Imas
(74) *Attorney, Agent, or Firm* — Collard & Roe, P.C.

(57) ABSTRACT

In at least one embodiment, there is an electrical device comprising a functional module comprising a housing having a front face and a back face, and at least three arcuate blades extending out from the housing. At least one of the at least three arcuate blades has a locking section. The functional module can be used in a wiring system comprising at least one wiring module. The wiring module can include a housing having a front face and a back face and at least one opening for receiving at least one of the at least three arcuate blades. The disclosure can also include a wiring module which can be used separately from the functional module wherein the wiring module includes a housing having at least one movable arm. Inside the wiring module is a plurality of contacts disposed in the housing, wherein these contacts are configured to couple to electrical wiring.

23 Claims, 13 Drawing Sheets

U.S. PATENT DOCUMENTS

| | | | |
|---|---|---|---|
| 3,156,761 A | 11/1964 | Schinske | |
| 3,233,204 A * | 2/1966 | De Vore, Jr. | 439/333 |
| 3,390,404 A | 6/1968 | Murchison | |
| 3,500,291 A * | 3/1970 | Hubbell et al. | 439/337 |
| 3,510,822 A | 5/1970 | Patterson | |
| 3,551,880 A | 12/1970 | Hartwell | |
| 3,609,647 A | 9/1971 | Castellano | |
| 3,641,472 A | 2/1972 | Phillips, Jr. | |
| 3,685,007 A * | 8/1972 | Riley et al. | 439/674 |
| 3,699,499 A | 10/1972 | Spaderna | |
| 3,716,651 A | 2/1973 | Werner | |
| 3,723,948 A | 3/1973 | Wyatt et al. | |
| 3,781,769 A | 12/1973 | Wiley | |
| 3,852,513 A | 12/1974 | Flahive | |
| 3,858,161 A | 12/1974 | Champion et al. | |
| 3,868,161 A | 2/1975 | Frantz | |
| 3,879,101 A | 4/1975 | McKissic | |
| 3,879,109 A | 4/1975 | Thomas | |
| 3,945,702 A * | 3/1976 | Poliak et al. | 439/337 |
| 3,957,336 A | 5/1976 | Bromberg | |
| 3,975,074 A | 8/1976 | Fuller | |
| 3,999,829 A | 12/1976 | Glaesel | |
| 4,075,758 A | 2/1978 | Parsons et al. | |
| 4,165,443 A | 8/1979 | Figart et al. | |
| 4,166,934 A | 9/1979 | Marrero | |
| 4,213,667 A | 7/1980 | Wittes | |
| 4,243,957 A | 1/1981 | Schmidt | |
| 4,245,880 A | 1/1981 | Zimmerman, Jr. et al. | |
| 4,255,007 A | 3/1981 | Michaels et al. | |
| 4,273,957 A | 6/1981 | Kolling, Jr. | |
| 4,289,921 A | 9/1981 | Gartner et al. | |
| 4,295,018 A | 10/1981 | Borrelli | |
| 4,336,418 A | 6/1982 | Hoag | |
| 4,386,820 A | 6/1983 | Dola et al. | |
| 4,399,371 A | 8/1983 | Ziff et al. | |
| 4,443,654 A | 4/1984 | Flachbarth et al. | |
| 4,477,141 A | 10/1984 | Hardesty | |
| 4,479,692 A | 10/1984 | Greenwood et al. | |
| 4,531,798 A | 7/1985 | Baur et al. | |
| 4,545,632 A | 10/1985 | Maier et al. | |
| 4,550,967 A | 11/1985 | Riches et al. | |
| 4,553,000 A | 11/1985 | Appleton | |
| 4,555,418 A | 11/1985 | Snider et al. | |
| 4,589,719 A | 5/1986 | Gentry et al. | |
| 4,606,595 A | 8/1986 | Dola | |
| 4,627,675 A | 12/1986 | Taylor et al. | |
| 4,657,334 A | 4/1987 | Simmons | |
| 4,669,804 A | 6/1987 | Munroe | |
| 4,699,804 A | 10/1987 | Miyata et al. | |
| 4,725,249 A | 2/1988 | Blackwood et al. | |
| 4,759,726 A | 7/1988 | Naylor et al. | |
| 4,842,551 A | 6/1989 | Heimann | |
| 4,875,871 A | 10/1989 | Booty, Sr. et al. | |
| 4,917,625 A | 4/1990 | Haile | |
| 4,918,258 A | 4/1990 | Ayer | |
| 4,960,388 A | 10/1990 | Frantz et al. | |
| 5,015,203 A | 5/1991 | Furrow | |
| 5,043,531 A | 8/1991 | Gutenson et al. | |
| 5,046,961 A | 9/1991 | Hoffman | |
| 5,057,646 A | 10/1991 | Nichols et al. | |
| 5,092,787 A | 3/1992 | Wise et al. | |
| 5,117,122 A | 5/1992 | Hogarth et al. | |
| D329,422 S | 9/1992 | Fujiyoshi | |
| 5,160,808 A | 11/1992 | Hadfield | |
| 5,162,611 A | 11/1992 | Nichols, III et al. | |
| 5,167,542 A | 12/1992 | Haitmanek | |
| 5,178,555 A | 1/1993 | Kilpatrick et al. | |
| 5,185,580 A | 2/1993 | Nichols, III et al. | |
| 5,190,468 A | 3/1993 | Nichols, III et al. | |
| 5,234,355 A | 8/1993 | Sosinski et al. | |
| D340,912 S | 11/1993 | Miller | |
| D340,913 S | 11/1993 | Miller | |
| D341,125 S | 11/1993 | Miller | |
| 5,297,973 A | 3/1994 | Gorman | |
| 5,328,387 A | 7/1994 | Hoffman | |
| 5,352,122 A | 10/1994 | Speyer et al. | |
| 5,397,806 A | 3/1995 | Soled et al. | |
| 5,397,929 A | 3/1995 | Hogarth et al. | |
| 5,399,806 A | 3/1995 | Olson | |
| 5,472,350 A | 12/1995 | Mehta | |
| 5,582,522 A | 12/1996 | Johnson | |
| 5,584,714 A | 12/1996 | Karst et al. | |
| 5,605,466 A | 2/1997 | Devlin et al. | |
| 5,641,310 A | 6/1997 | Tiberio, Jr. | |
| 5,662,500 A | 9/1997 | Yeah | |
| 5,680,926 A | 10/1997 | Sandor et al. | |
| 5,741,149 A | 4/1998 | Anthony | |
| 5,785,551 A | 7/1998 | Libby | |
| 5,816,733 A | 10/1998 | Ishikawa et al. | |
| D405,761 S | 2/1999 | Yu | |
| 5,865,633 A | 2/1999 | Hou | |
| D411,170 S | 6/1999 | Deutsch | |
| 5,964,618 A | 10/1999 | McCarthy | |
| 5,975,938 A | 11/1999 | Libby | |
| 6,028,268 A | 2/2000 | Stark et al. | |
| 6,045,374 A | 4/2000 | Candeloro | |
| 6,071,132 A | 6/2000 | Cook | |
| D430,539 S | 9/2000 | Leopold et al. | |
| 6,154,774 A | 11/2000 | Furlong et al. | |
| D434,726 S | 12/2000 | Middlehurst | |
| D434,729 S | 12/2000 | Hwang | |
| 6,156,971 A | 12/2000 | May | |
| 6,171,129 B1 | 1/2001 | Phillips | |
| 6,203,349 B1 | 3/2001 | Nakazawa | |
| 6,287,152 B1 | 9/2001 | Yang | |
| 6,309,248 B1 | 10/2001 | King | |
| 6,319,016 B1 | 11/2001 | Juntwait | |
| 6,328,581 B1 | 12/2001 | Lee et al. | |
| 6,341,981 B1 | 1/2002 | Gorman | |
| 6,376,770 B1 | 4/2002 | Hyde | |
| 6,417,450 B1 | 7/2002 | Young | |
| 6,457,988 B1 | 10/2002 | Andersen | |
| 6,494,728 B1 | 12/2002 | Gorman | |
| 6,515,564 B2 | 2/2003 | Leopold et al. | |
| 6,544,049 B1 | 4/2003 | Pierson, Jr. | |
| 6,558,190 B1 | 5/2003 | Pierson, Jr. | |
| 6,563,049 B2 | 5/2003 | May | |
| 6,617,511 B2 | 9/2003 | Schultz et al. | |
| 6,669,495 B2 | 12/2003 | Philips et al. | |
| 6,739,900 B2 | 5/2004 | Mortun et al. | |
| 6,767,245 B2 | 7/2004 | King | |
| 6,774,307 B2 | 8/2004 | Kruse et al. | |
| 6,817,873 B1 | 11/2004 | Gorman | |
| 6,829,124 B2 | 12/2004 | Leopold et al. | |
| 6,831,226 B2 | 12/2004 | Allen, Jr. | |
| 6,843,680 B2 | 1/2005 | Gorman | |
| 6,843,682 B2 | 1/2005 | Matsuda et al. | |
| 6,845,023 B2 | 1/2005 | Philips et al. | |
| 6,857,903 B2 | 2/2005 | Hyde | |
| 6,863,561 B2 | 3/2005 | Gorman | |
| 6,870,099 B1 * | 3/2005 | Schultz et al. | 174/53 |
| 6,876,888 B2 | 4/2005 | Locke | |
| 6,884,111 B2 | 4/2005 | Gorman | |
| 6,893,297 B2 | 5/2005 | Chen | |
| 6,894,221 B2 | 5/2005 | Gorman | |
| 6,939,179 B1 | 9/2005 | Kieffer, Jr. et al. | |
| 6,945,815 B1 | 9/2005 | Mullally | |
| 6,955,559 B2 | 10/2005 | Pyrros | |
| 6,979,212 B1 | 12/2005 | Gorman | |
| 6,986,674 B1 | 1/2006 | Gorman | |
| 6,994,585 B2 | 2/2006 | Benoit et al. | |
| 7,004,595 B1 | 2/2006 | Stoddard | |
| 7,008,246 B2 | 3/2006 | Zhuge | |
| 7,031,602 B2 | 4/2006 | Faries, Jr. et al. | |
| 7,052,313 B2 | 5/2006 | Gorman | |
| 7,058,525 B2 | 6/2006 | Bertness et al. | |
| 7,060,897 B2 | 6/2006 | Gorman | |
| 7,081,009 B2 | 7/2006 | Gorman | |
| 7,081,010 B2 | 7/2006 | Gorman | |
| 7,101,187 B1 | 9/2006 | Deconinck et al. | |
| 7,104,836 B2 | 9/2006 | Gorman | |
| 7,160,149 B1 | 1/2007 | Chawgo | |
| 7,168,969 B1 | 1/2007 | Wang | |
| D537,414 S | 2/2007 | Saito | |
| 7,175,463 B2 | 2/2007 | Burton | |
| 7,189,110 B1 | 3/2007 | Savicki, Jr. | |
| 7,195,517 B1 | 3/2007 | Savicki, Jr. | |

| | | |
|---|---|---|
| 7,223,126 B2 | 5/2007 | Ng |
| 7,234,962 B1 | 6/2007 | Lin |
| D547,721 S | 7/2007 | Harano et al. |
| 7,265,291 B1 | 9/2007 | Gorman |
| 7,273,392 B2 | 9/2007 | Fields |
| 7,285,009 B1 | 10/2007 | Benoit et al. |
| 7,321,120 B1 | 1/2008 | Gorman et al. |
| D563,877 S | 3/2008 | Grant |
| 7,357,652 B1* | 4/2008 | Arenas et al. .............. 439/107 |
| 7,367,121 B1 | 5/2008 | Gorman |
| 7,407,410 B1 | 8/2008 | Benoit et al. |
| 7,459,632 B2 | 12/2008 | Bowman |
| 7,470,145 B1 | 12/2008 | Savicki, Jr. et al. |
| 7,510,429 B1 | 3/2009 | Savicki, Jr. et al. |
| 7,528,609 B2 | 5/2009 | Savicki, Jr. et al. |
| 7,537,472 B1 | 5/2009 | Schwarz et al. |
| 7,563,131 B2 | 7/2009 | Sullivan et al. |
| 7,597,570 B2 | 10/2009 | So |
| 7,601,023 B1 | 10/2009 | Ma et al. |
| 7,632,119 B1 | 12/2009 | Ma et al. |
| 7,632,137 B1 | 12/2009 | Ma et al. |
| 7,666,010 B2* | 2/2010 | Arenas et al. .............. 439/107 |
| 7,713,084 B1 | 5/2010 | Weeks et al. |
| 7,722,389 B2 | 5/2010 | Benoit et al. |
| D616,831 S | 6/2010 | Arenas et al. |
| D618,627 S | 6/2010 | Arenas et al. |
| 7,780,470 B2 | 8/2010 | Benoit et al. |
| 7,955,096 B2* | 6/2011 | Arenas et al. .............. 439/107 |
| 2002/0052139 A1 | 5/2002 | Gorman |
| 2002/0055301 A1 | 5/2002 | Gorman |
| 2002/0064983 A1 | 5/2002 | Patey |
| 2003/0236011 A1 | 12/2003 | Gorman |
| 2004/0130218 A1 | 7/2004 | Locke |
| 2004/0206541 A1 | 10/2004 | Locke |
| 2004/0266236 A1 | 12/2004 | Hughes |
| 2005/0006124 A1 | 1/2005 | Kruse et al. |
| 2005/0070161 A1 | 3/2005 | Dunwoody |
| 2005/0075007 A1 | 4/2005 | Benoit et al. |
| 2005/0250377 A1 | 11/2005 | Gorman |
| 2005/0250378 A1 | 11/2005 | Gorman |
| 2005/0272304 A1 | 12/2005 | Gorman |
| 2005/0272305 A1 | 12/2005 | Gorman |
| 2006/0030183 A1 | 2/2006 | Yoshida et al. |
| 2006/0286874 A1 | 12/2006 | Ritchie |
| 2008/0149551 A1 | 6/2008 | Brugger et al. |
| 2008/0207046 A1 | 8/2008 | Arenas et al. |
| 2008/0268679 A1 | 10/2008 | Tiberio et al. |
| 2009/0053925 A1 | 2/2009 | Pyrros |
| 2009/0197461 A1 | 8/2009 | Benoit et al. |
| 2009/0227122 A1 | 9/2009 | Jubelirer et al. |
| 2010/0120274 A1 | 5/2010 | Arenas et al. |
| 2010/0227484 A1 | 9/2010 | Arenas et al. |

FOREIGN PATENT DOCUMENTS

JP 10-321328 4/1998

OTHER PUBLICATIONS

International Preliminary Report on Patentability for PCT/US2007/082460; Mailed on Apr. 28, 2009; 8 pages.
"Practical Electrical Wiring" by Herbert P. Richter and W. Creighton Schwan, 17th edition, Chapter 8, New York: McGraw-Hill Companies, 1996, 13 pages.
BRK Electronics; User's Manual—Smoke Alarms; Jun. 2000, as disclosed in Reissue 95/000200.
U.S. Office Action Mailed on Jul. 3, 2007 for U.S. Appl. No. 11/553,793, filed Oct. 27, 2006 which was issued as U.S. Patent No. 7,357,652 on Apr. 15, 2008.
Notice of Allowance Mailed on Nov. 26, 2007 for U.S. Appl. No. 11/553,793, filed Oct. 27, 2006 which was issued as U.S. Patent No. 7,357,652 on Apr. 15, 2008.
U.S. Office Action Mailed on Jan. 6, 2009 for U.S. Appl. No. 12/040,648, filed Feb. 29, 2008 which was issued as U.S. Patent No. 7,666,010 on Feb. 23, 2010.
U.S. Final Office Action Mailed on Jun. 8, 2009 for U.S. Appl. No. 12/040,648, filed Feb. 29, 2008 which was issued as U.S. Patent No. 7,666,010 on Feb. 23, 2010.
Notice of Allowance Mailed on Oct. 6, 2009 for U.S. Appl. No. 12/040,648, filed Feb. 29, 2008 which was issued as U.S. Patent No. 7,666,010 on Feb. 23, 2010.
Notice of Allowance Mailed on Jan. 14, 2010 for U.S. Appl. No. 12/040,648, filed Feb. 29, 2008 which was issued as U.S. Patent No. 7,666,010 on Feb. 23, 2010.
U.S. Notice of Allowance Mailed on May 14, 2010 for U.S. Appl. No. 29/337,364, filed May 20, 2009 which was issued as U.S. Design Patent D618,227 on Jun. 29, 2010.
U.S. Notice of Allowance Mailed on Jul. 9, 2008 for U.S. Appl. No. 29/284,192, filed Sep. 1, 2007.
U.S. Notice of Allowance Mailed on Jan. 26, 2010 for U.S. Appl. No. 29/327,447, filed Nov. 5, 2008 which issued as U.S. Design Patent D616,831 on Jun. 1, 2010.
U.S. Office Action Mailed on Aug. 20, 2010 for U.S. Appl. No. 12/689,163, filed Jan. 18, 2010.
U.S. Final Office Action Mailed on Dec. 3, 2010 for U.S. Appl. No. 12/689,163, filed Jan. 18, 2010.
U.S, Office Action Mailed on Mar. 11, 2011 for U.S. Appl. No. 12/689,163, filed Jan. 18, 2010.
U.S. Final Office Action Mailed on Jun. 27, 2011 for U.S. Appl. No. 12/689,163, filed Jan. 18, 2010.
U.S. Office Action Mailed on Oct. 18, 2010 for U.S. Appl. No. 12/685,656, filed Jan. 11, 2010 which was issued as U.S. Patent No. 7,955,096 on Jun. 7, 2011.
U.S. Notice of Allowance Mailed on Jan. 25, 2011 for U.S. Appl. No. 12/685,656, filed Jan. 11, 2010 which was issued as U.S. Patent No. 7,955,096 on Jun. 7, 2011.
U.S. Notice of Allowance Mailed on Feb. 22, 2011 for U.S. Appl. No. 12/685,656, filed Jan. 11, 2010 which was issued as U.S. Patent No. 7,955,096 on Jun. 7, 2011.
U.S. Notice of Allowance Mailed on Apr. 28, 2011 for U.S. Appl. No. 12/685,656, filed Jan. 11, 2010 which was issued as U.S. Patent No. 7,955,096 on Jun. 7, 2011.
U.S. Office Action Mailed on Jul. 13, 2011 for U.S. Appl. No. 13/099,318, filed May 2, 2011.
U.S. Notice of Allowance Mailed on Sep. 26, 2011 for U.S. Appl. No. 12/689,163, filed Jan. 18, 2010.
U.S. Final Office Action Mailed on Oct. 27, 2011 for U.S. Appl. No. 13/099,318, filed May 2, 2011.
Office Action Dated Jun. 20, 2012 for U.S. Appl. No. 13/099,318.
Office Action Dated Feb. 23, 2012 for U.S. Appl. No. 13/099,318.
Office Action in U.S. Appl. No. 13/194,898 Dated Mar. 27, 2012.

* cited by examiner

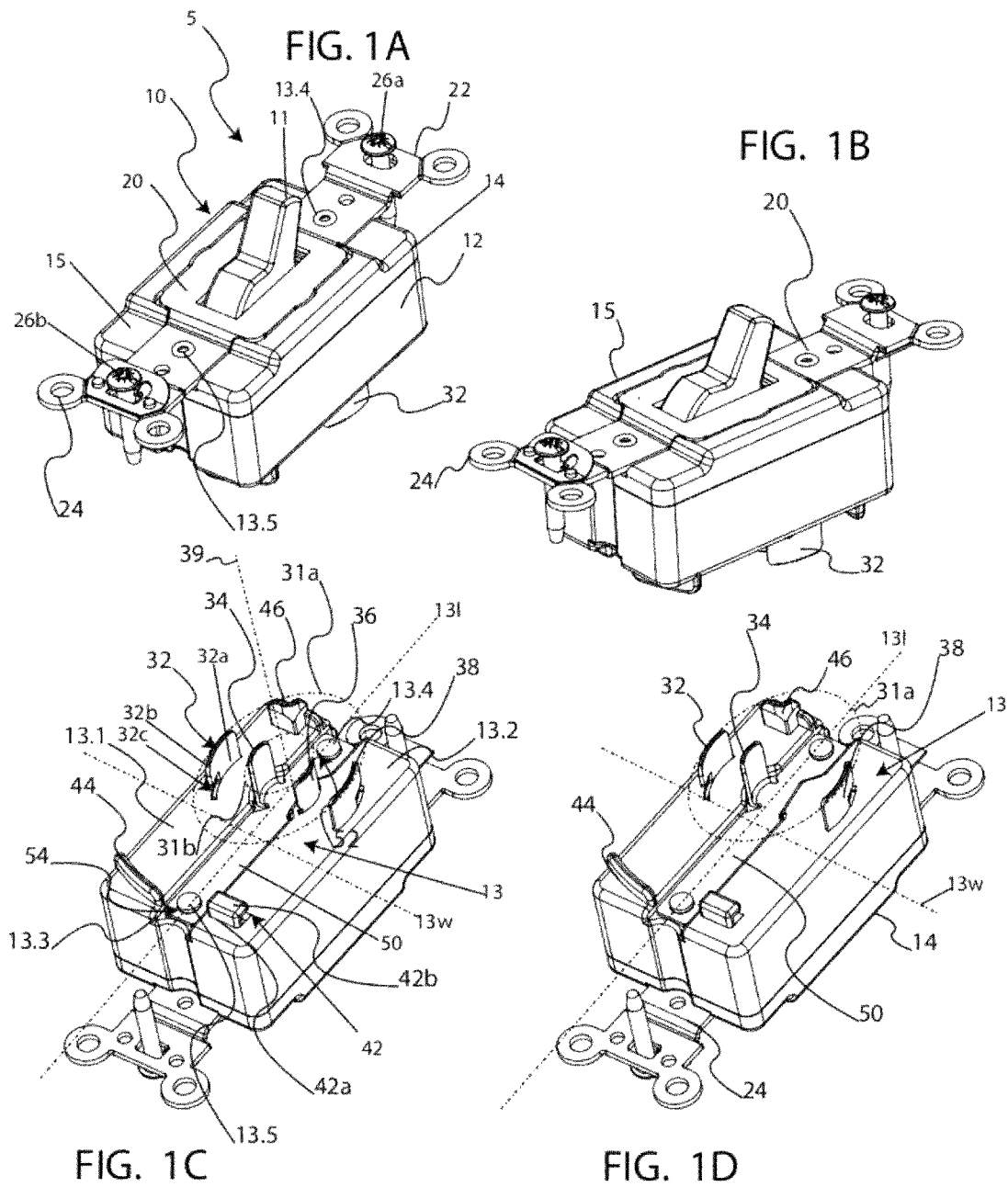

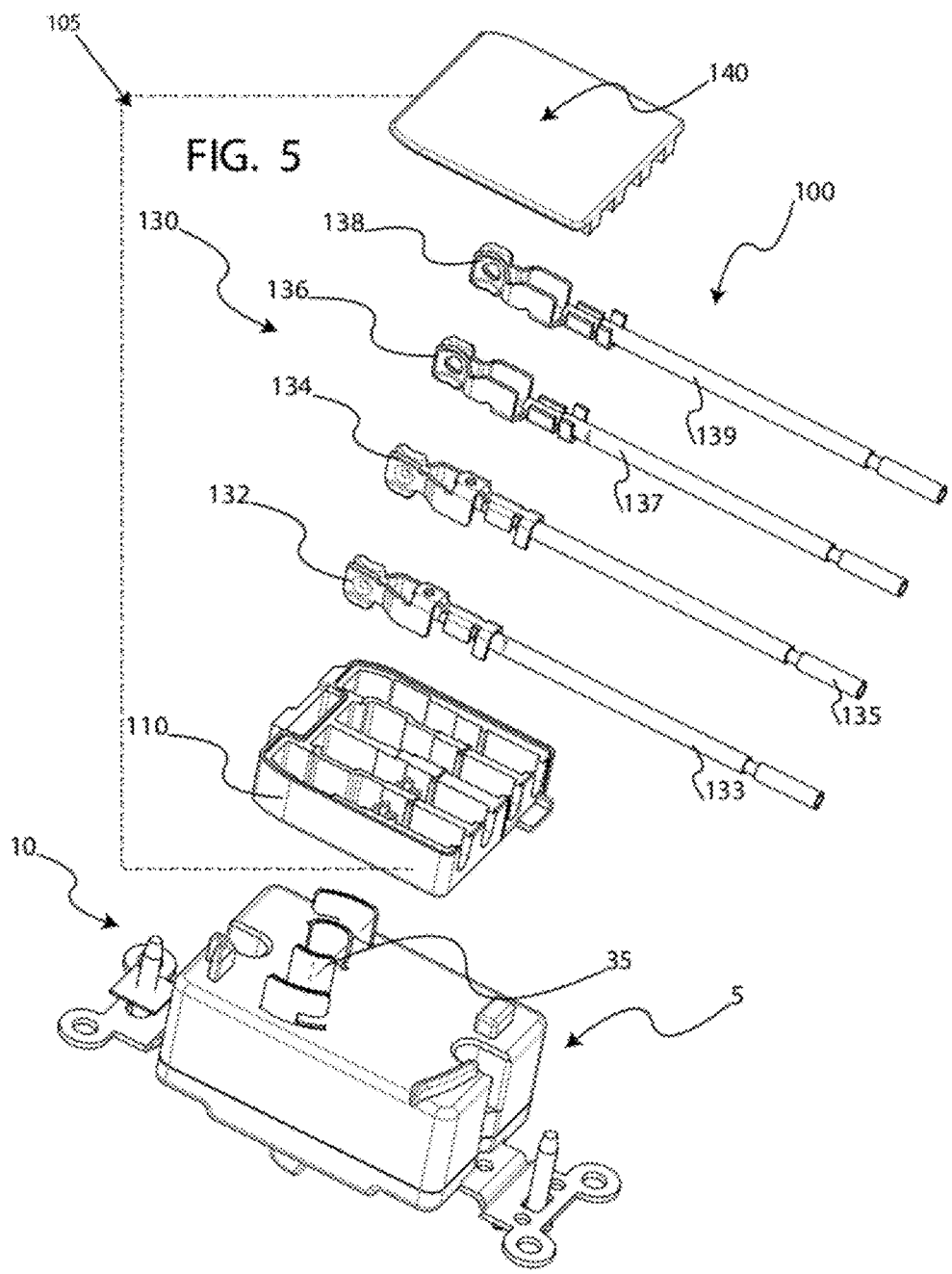

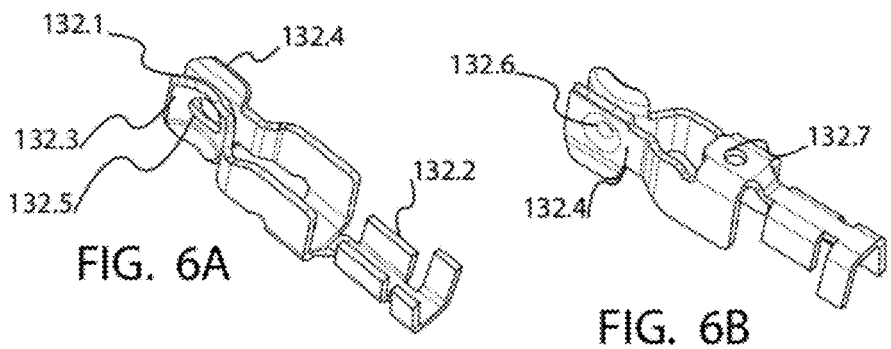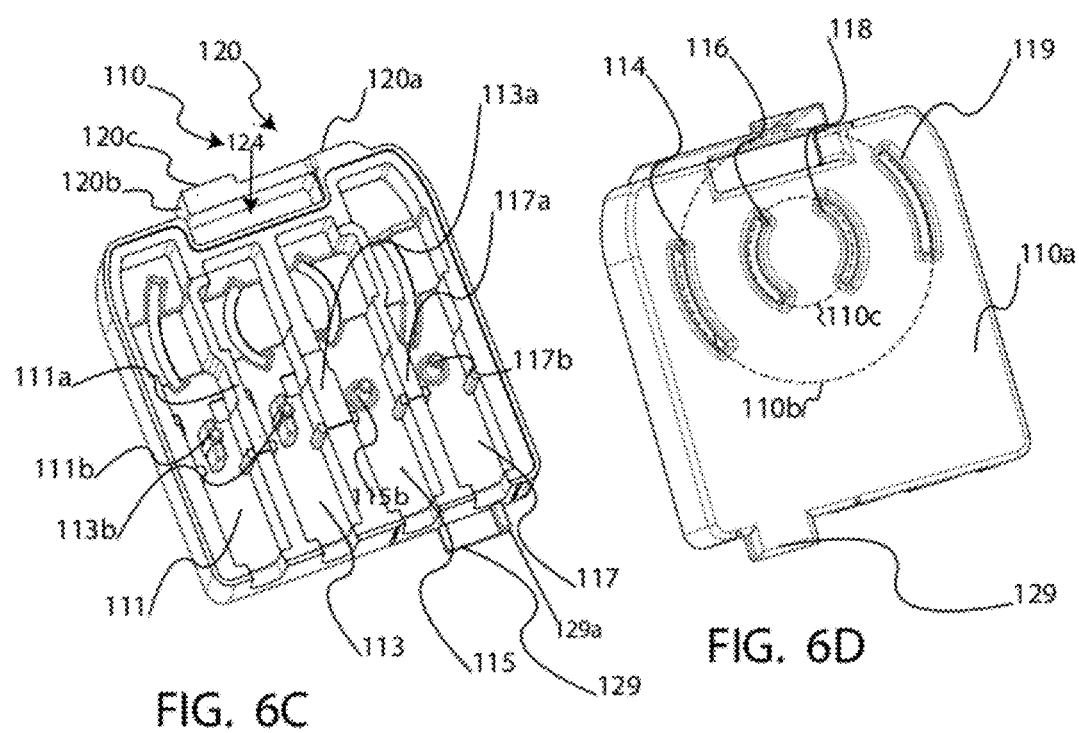

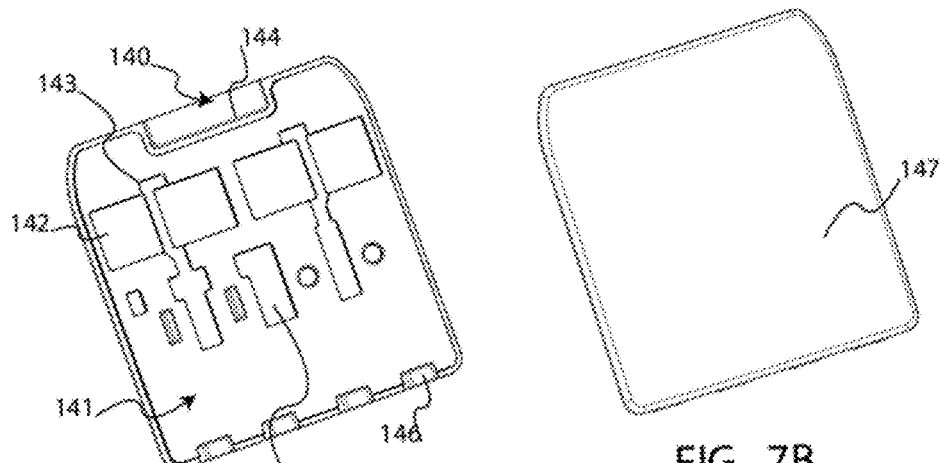
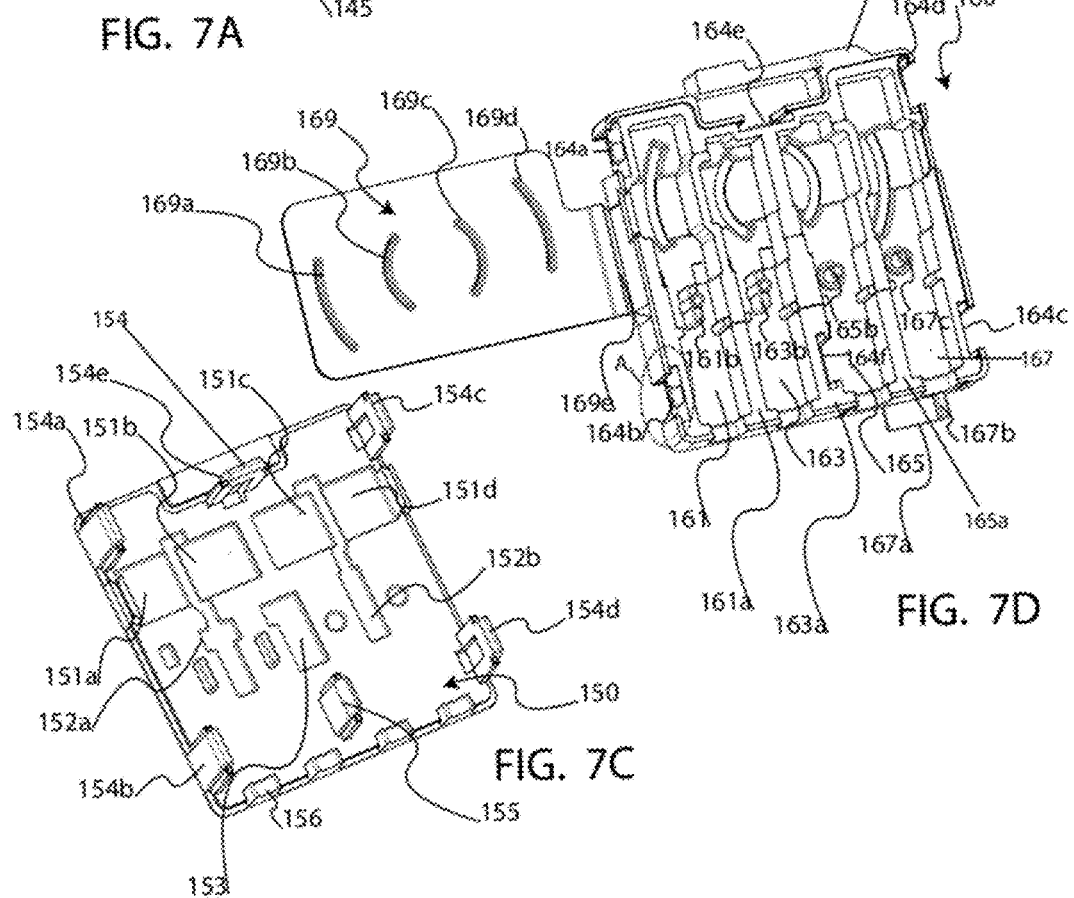

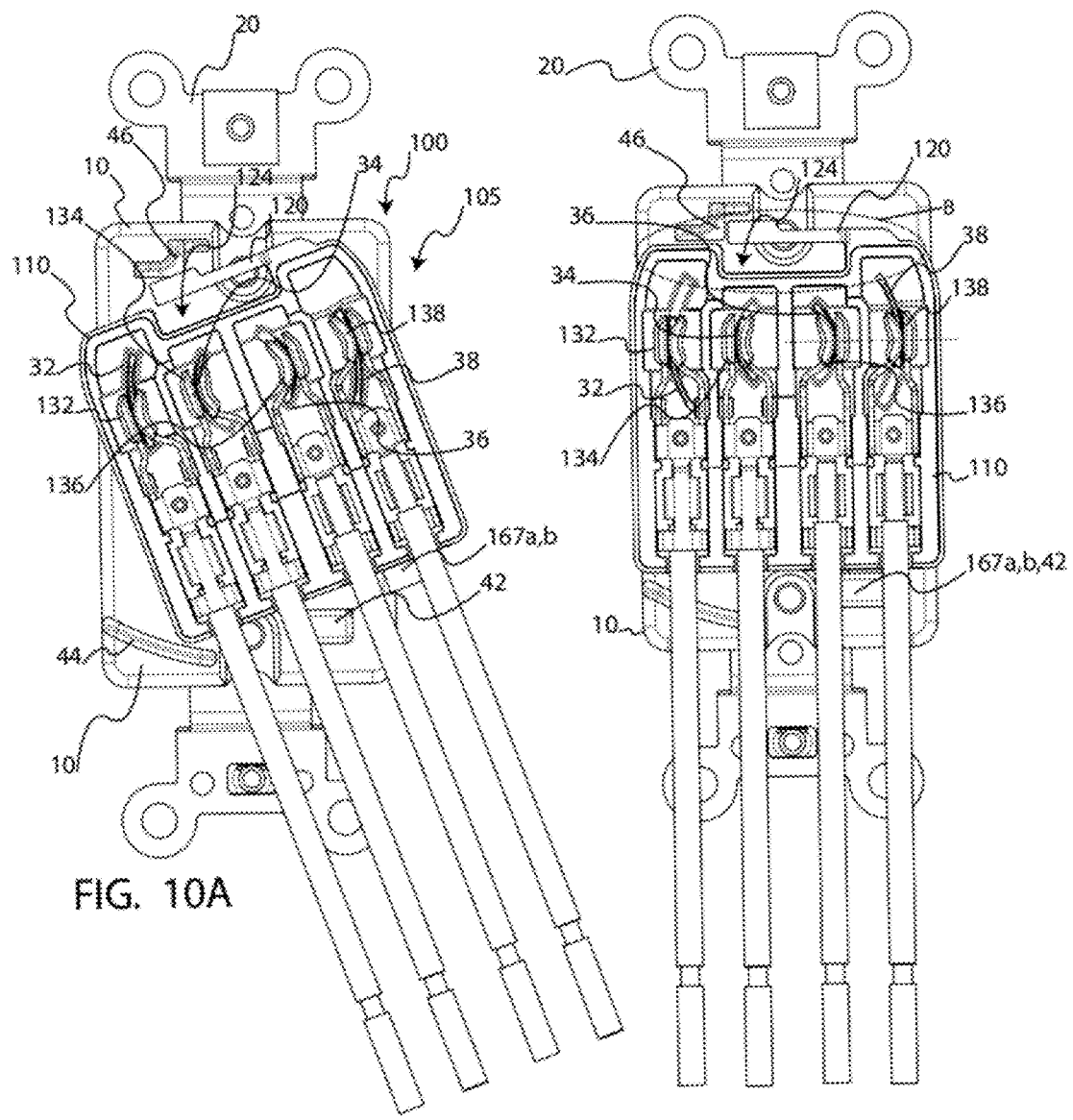

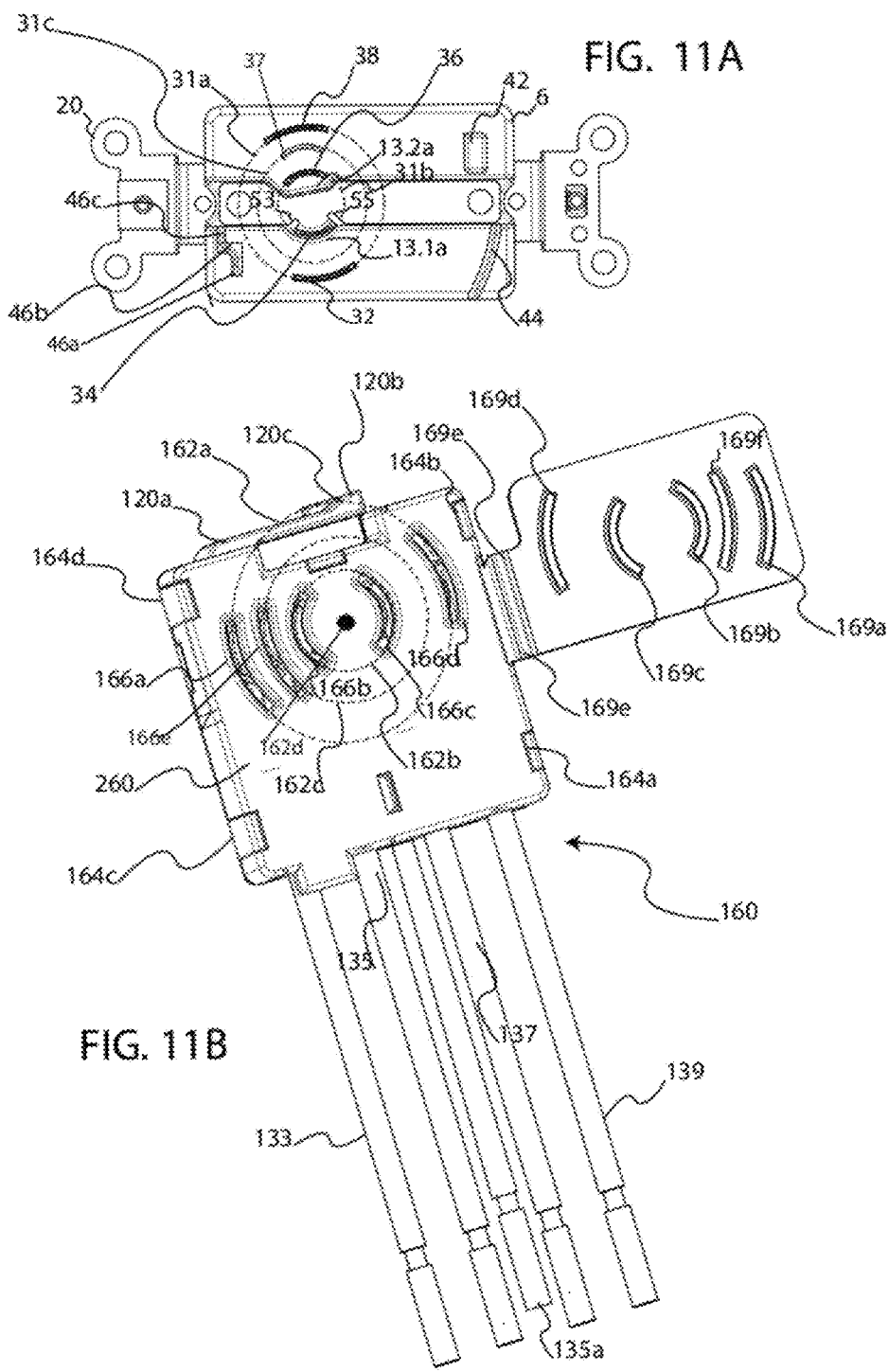

MODULAR WIRING SYSTEM

BACKGROUND

One embodiment of the invention relates to a functional module, another embodiment relates to a wiring module and another embodiment relates to a modular wiring system having locking elements. Other patents which may relate to any one of the embodiments listed below are: U.S. Pat. No. 7,955,096, which issued on Jun. 7, 2011; U.S. Pat. No. 7,666,010 which issued on Feb. 23, 2010; U.S. Pat. No. 7,357,652 which issued on Apr. 15, 2008; or, design patent nos. U.S. D618,627 which issued on Jun. 29, 2010; U.S. D616,831 which issued on Jun. 1, 2010, wherein the disclosures of these patents are hereby incorporated herein by reference.

SUMMARY

In at least one embodiment, there is an electrical device comprising a functional module comprising a housing having a front face and a back face, and at least three arcuate blades extending out from the housing. At least one of the at least three arcuate blades has a locking section.

In at least one embodiment, there is a functional module that does not include center ground pin, but rather includes a ground blade arranged concentrically around a center region. This design, which removes the more costly posts, allows for a less expensive method for manufacture. This is because the part can be punched, stamped or molded in place using a less costly manufacturing technique, rather than having to be machined on a lathe.

The functional module can be used in a wiring system comprising at least one wiring module. The wiring module can include a housing having a front face and a back face and at least one opening for receiving at least one of the at least three arcuate blades.

The invention can also include a wiring module which can be used separately from the functional module, wherein the wiring module includes a housing having at least one movable arm. The movable arm can be used for selectively securing the wiring module against rotation. Inside the wiring module is a plurality of contacts disposed in the housing, wherein these contacts are configured to couple to electrical wiring.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 1A is a front perspective view of a functional module;

FIG. 1B is a side perspective view of the functional module;

FIG. 1C is a back perspective view of a first embodiment of a functional module;

FIG. 1D is a back perspective view of a second embodiment of a functional module;

FIG. 5 is a back perspective exploded view of a wiring module and functional module;

FIG. 6A is a first side perspective view of a contact for the wiring module;

FIG. 6B is an opposite side perspective view of a contact for the wiring module;

FIG. 6C is a first side perspective view of a front portion for the wiring module;

FIG. 6D is an opposite side perspective view of the front portion of the wiring module;

FIG. 7A is a perspective view of an inside face of the back portion of the wiring module;

FIG. 7B is a perspective view of an outside face of the back portion of the wiring module;

FIG. 7C is a perspective view of an inside face of a second embodiment back portion of a wiring module;

FIG. 7D is a back perspective view of a front portion of the wiring module;

FIG. 10A is a back view of the wiring module coupled to a functional module in a first unsecured position with the back portion of the wiring module removed;

FIG. 10B is a back view of the wiring module coupled to a functional module in a second coupled position with the back portion of the wiring module removed;

FIG. 11A is a back view of another embodiment of a functional module having an additional arcuate blade;

FIG. 11B is a front perspective view of a wiring module having an additional opening for the additional blade of the functional module of the embodiment in FIG. 11A;

DETAILED DESCRIPTION

Figure 2A:
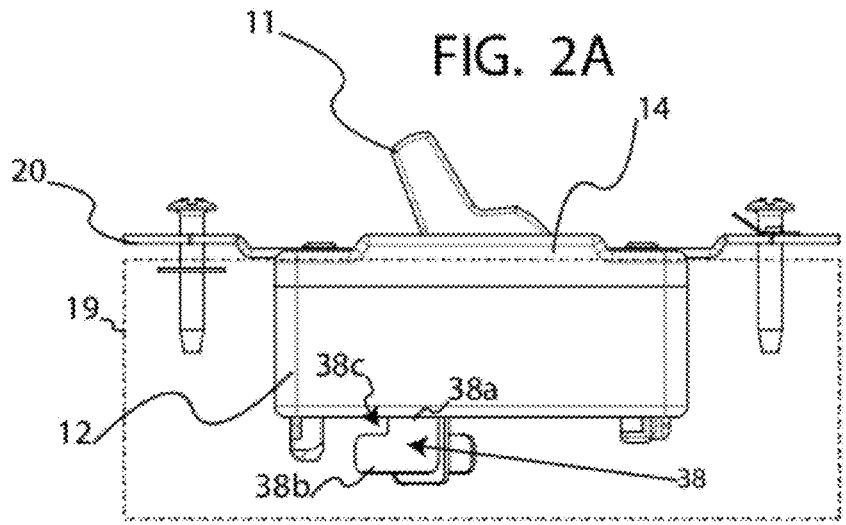
FIG. 2A is a side view of the functional module shown in any one of FIGS. 1A-1D.

Turning now to the drawings, FIGS. 1A and 1B show an electrical device including: a functional module 5 including a housing 10 having a front face 15 and a back face 13 (FIG. 1D). There is a functional element 11 which can be any type of functional element associated with the functional module. In this embodiment the functional element is a switch. However, the functional element can be, but not limited to, any one of a switch, a receptacle, a combination device, a fault circuit interrupter, an occupancy sensor, a remote controlled home automation module, nightlight or light combination device such as that shown in U.S. Pat. No. 7,862,350 to Richter, which issued on Jan. 4, 2011 the disclosure hereby being incorporated herein by reference in its entirety, or any other type of functional element known in the art. The functional module 5 can be configured to be installed into a wallbox, such as a wall mounted box 19 (see FIG. 2A) which can be (but not limited to) in the form of a single gang enclosure. The dimensions of a single gang enclosure are generally known in the art and are configured to receive a standard wall mounted electrical device, such as a switch, a duplex receptacle, an occupancy sensor, a combination device, etc.

Housing 10 includes a front portion 14 and a back portion 12. Front portion 14 is configured to be coupled to back portion 12, in any known manner and has a front face 15. A strap 20 is coupled to front portion 14 and includes a first end 22 and a second end 24. In addition, there are securing elements (i.e. screws 26a and 26b) which are, or can be coupled to the strap, and are configured to secure the functional module to an associated wall box.

As shown in FIGS. 1A and 1B, there is at least one prong or blade 32 extending from a back face 13 (see FIGS. 1C and 1D) of the functional module 5.

As shown in FIGS. 1C and 1D, extending out from the back face 13 are at least three arcuate blades 32, 34, 36, and 38 extending out from housing 10 (see FIG. 1A) wherein at least one of the at least three arcuate blades has a locking section. For example, arcuate blade 32 includes a first section 32a and a second section 32b. First section 32a includes a gap 32c which allows arcuate blade 32 to engage with an associated or complementary housing of an associated wiring module to form a secure connection.

Similarly, arcuate blade 38 also includes a first section 38a, a second section 38b and a gap or opening 38c which allows blade 38 to engage/lock with a corresponding or complementary housing of an associated wiring module (see FIG. 10B). As shown with contacts 32 and 38, at least one of the arcuate blades is essentially L-shaped.

As shown in FIG. 1C, there is longitudinal line 13*l* and latitudinal line 13*w*. Longitudinal line 13*l* shows the longitudinal extension or length of housing 10, while latitudinal line 13*w* shows the width of housing 10. Latitudinal line 13*w* also bisects back face 13 showing that the blades 32, 34, 36 and 38 (as shown in FIG. 1C) or blades 32, 34, and 38 (as shown in FIG. 1D) extend from one half of the back face 13. These blades extend from one side or end of back face 13 so that wiring on an associated wiring module can extend parallel to the back face.

In addition, back face 13 comprises a plurality of different sections. For example, there is a first section 13.1 that is on one side of longitudinal line 13*l*, a second section 13.2 that is on an opposite side of longitudinal line 13*l*, and a third section 13.3 that is in a center region along longitudinal line 13*l*. Third section 13.3 is an indented section which includes at least one (and in this embodiment two) connection elements 13.4 and 13.5 extending from section 13.3. These connection elements can be in the form of rivets, which engage with strap 20 and configured to connect to a plate 50, thereby electrically coupling strap 20 to plate 50.

In addition, at least one of the arcuate blades, such as blade 34, is electrically coupled to a strap, such as strap 20. While strap 20 is coupled to a front face 15 of functional module 5, the blade 34 extends to the strap to form a grounded blade for the device. In addition, plate 50 is configured as a grounding plate coupled to back face 13 in the region of third section 13.3. Third section 13.3 is configured as an indented section, or below surface channel for contacting plate 50. Plate 50 can be any element which can provide grounding to the electrical device. For example, plate 50 can be a conductor such as metal (i.e. copper, brass, etc.) or any other conductor which can be coupled to arcuate blade 34 to provide grounding contact to arcuate blade 34. Thus, the connection of arcuate blade 34 to plate 50 forms an electrical connection from strap 20 to back plate 50 and to blade 34.

In addition, the electrical connection is formed by rivets 13.4 and 13.5 electrically connecting both elements together. Plate 50 can be of any suitable shape but in this case is formed as a plate having connection elements at each end. These connection elements comprise holes 52 and 54 which are configured to receive rivets 13.4 and 13.5 of back face 13 so that plate 50 can be coupled on to back face 13. Thus, because in this embodiment, blade 34 is grounded, at least two of the arcuate blades such as blades 32 and 38 are electrically isolated from blade 34. For example, blade 32 can be for coupling to a phase line, while blade 38 can be for coupling to a neutral line or vice versa. Blade 36 can then be configured to be coupled to a line (i.e. control line) such as for a three way switch. As shown in FIG. 1C, these blades are formed around concentric reference circles and without a center prong. For example, first reference circle 31a is formed concentric or substantially concentric with second reference circle 31b about a central rotational axis 39 formed on a center region of a back face 13 of the housing 10. Both reference circles 31a, 31b and rotational axis 39 are shown in dashed-dotted lines to show that they are simply shown as points of reference for the arrangement and shape of blades 32, 34, 36, and 38. As shown in FIG. 1D, if only three blades are used, then the blade 36 is not present, however the remaining blades 32, 34, and 38 can be arranged around the reference circles. These reference circles and the arrangement of the blades are also shown in FIGS. 2B and 2C as well.

In addition, extending from housing 10, and in particular extending from back face 13 of housing 10, are non-conductive connection elements 42, 44, and 46. Non-conductive connection elements include a connection element 42, which is configured as an L-shaped connection element having a first part 42a and a second part 42b. First part 42a extends out substantially perpendicular to back face 13, while second part 42b forms a retention feature and extends substantially parallel to back face 13 and substantially perpendicular to first part 42a.

The second non-conductive connection element 44 comprises an arcuate or circular shaped connection element 44, which serves as a guide for an associated wiring module in its rotation from an unconnected state to a connected state (see FIGS. 10A and 10B). The third non-conductive connection element 46 includes a block or post which forms a locking post and configured to form a lock with an associated coupling element of a wiring module (see, for example, movable arm 120). Third connection element 46 can be in the form of an S-shaped locking post.

The two embodiments shown in FIGS. 1C and 1D are configured such that if the functional elements are in the form of a switch the embodiment of FIG. 1C is a three way switch while the embodiment of FIG. 1D is a single pole switch.

Figure 2B:
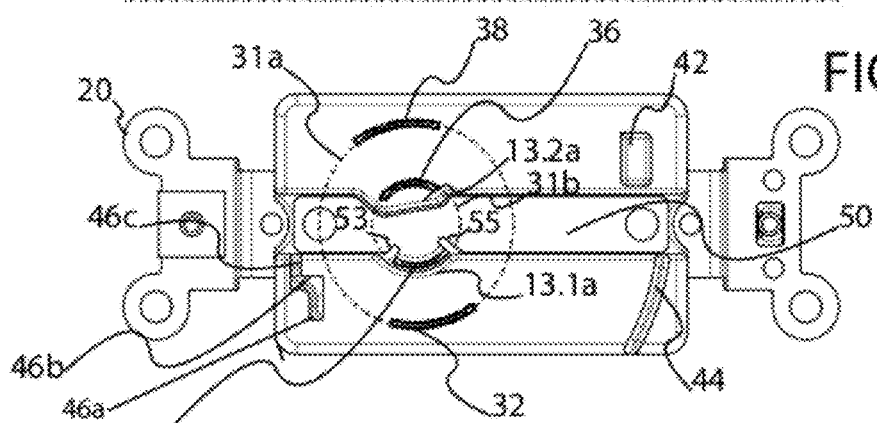
FIG. 2B is a back view of the functional module shown in FIGS. 1A, 1B, and 1C.
Figure 2C:
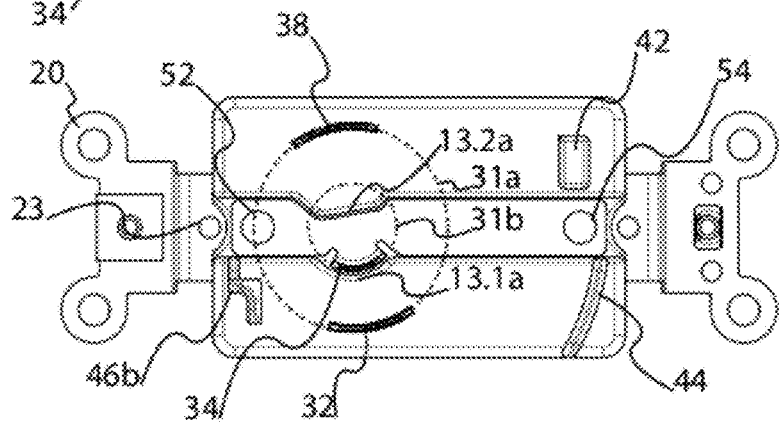
FIG. 2C is a back view of the functional module shown in FIGS. 1A, 1B and 1D.

FIG. 2A shows a side view of an electrical device showing arcuate blade 38 extending out in a L-shaped manner and including a first section 38a, a second section 38b, and an open section 38c. The open section 38c serves along with first section 38a as a locking section to allow the blade to be secured to a corresponding contact of a wiring module and prevent undesirable dislocation of the wiring module from the functional module.

FIG. 2B shows the back view of the embodiment of FIG. 1C, and FIG. 2C shows the back view of the embodiment of FIG. 1D. FIG. 2B shows a back view of an electrical device which shows blades 32, 34, 36 and 38 and non-conductive connection elements 42, 44, and 46 as well as a more detailed view of plate 50. As shown, blade 34 is coupled to plate 50, wherein plate 50 has cut out sections 53 and 55 surrounding the connection with blade 34. In addition, back face 13 is shown in greater detail which shows additional sections or configurations 13.1*a* and 13.2*a*. Section or configuration 13.2*a* is an extension of section 13.2 which allows additional room for blade 36. Section 13.1*a* is an indent in section 13.1 which allows additional room for blade 34. In addition, as shown in this view, non-conductive connection element 46 is shown as a locking block 46 having three parts, 46*a*, 46*b*, and 46*c* wherein this non-conductive connection element forms an S-shaped connection element configured to selectively lock to an associated housing of a wiring module. First part 46*a* is an initial contact section for contacting a locking arm of an associated wiring module as the wiring module is being rotated from an unlocked position to a locked position. Second section 46*b* forms a locking stop that prevents the counter rotation of an associated wiring module once it is rotated into place. Third section 42*c* is configured to stop or prevent additional rotation of a wiring module arm.

In addition, FIG. 2C shows holes 52 and 54 which are formed in plate 50 and configured to receive associated connection elements or rivets 13.4 and 13.5. FIG. 2C also shows that plate 50 has holes 52 and 54 allowing arcuate blade 34 to be formed integral with plate 50 by folding the metal.

Figure 3A:
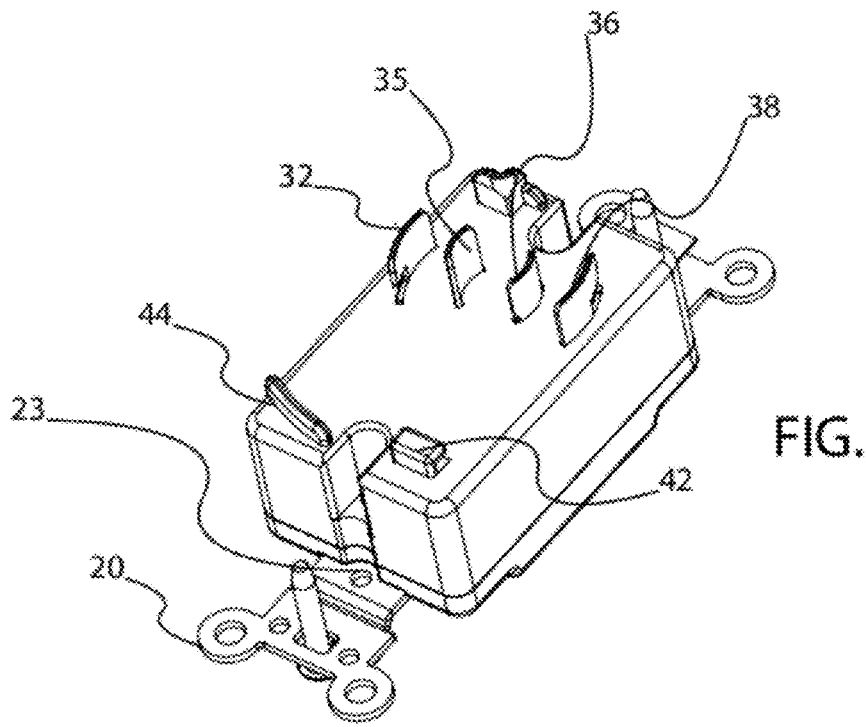
FIG. 3A is a back perspective view of another embodiment of a functional module.
Figure 3B:
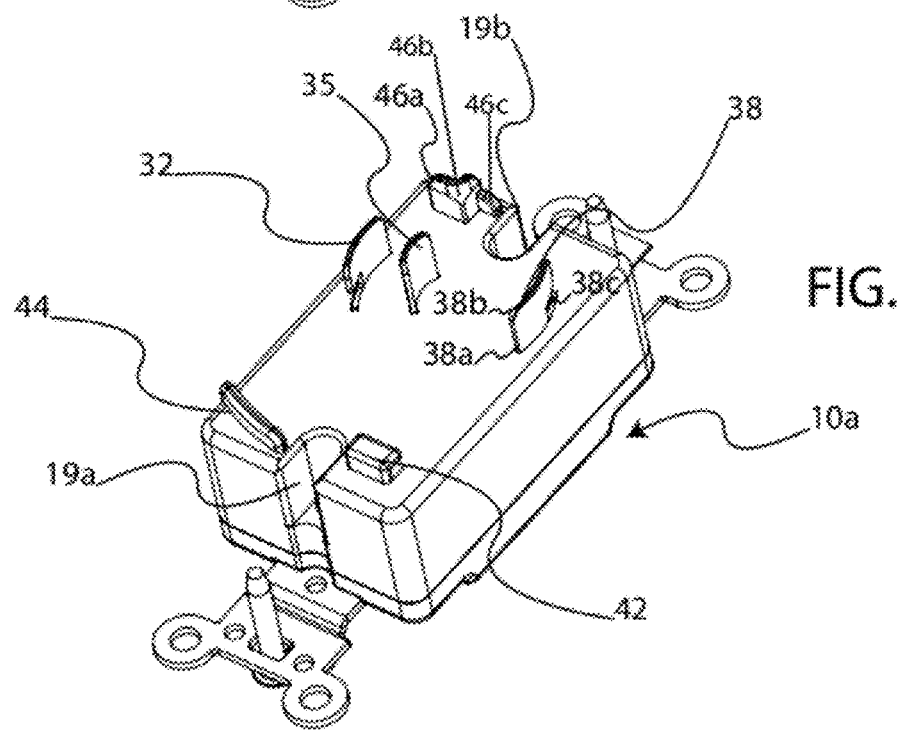
FIG. 3B is a back perspective view of another embodiment of a functional module.

FIGS. 3A and 3B show two different embodiments which are configured similar to the embodiments shown in FIGS. 1A-1D and 2A-2C, but the embodiments in FIGS. 3A and 3B do not contain a plate, such as plate 50. Therefore, the configuration or embodiment of FIG. 3A is a three way switch, while the configuration or embodiment of FIG. 3B is a single pole switch. As shown in FIG. 3B, section 46*b* includes a beveled edge, allowing a movable arm of an associated wiring module to slide against this stop region during rotation. In addition, section 46*c* is an element which forms a rotational lock and locks the device against rotation. In these embodiments, blade 35 extends entirely through the housing 10*a* and therefore to a front face such as to strap 20, thereby removing any need for an additional plate. In these embodiments, there is also shown in body 10*a* a set of indents 19*a* and 19*b* for rivets 13.4 and 13.5 (see FIG. 1C) or 23*a* and 23*b* (see FIG. 4A). There is also shown an opening for receiving a screw or other fastener for securing the strap to a wallbox.

Figure 4A:
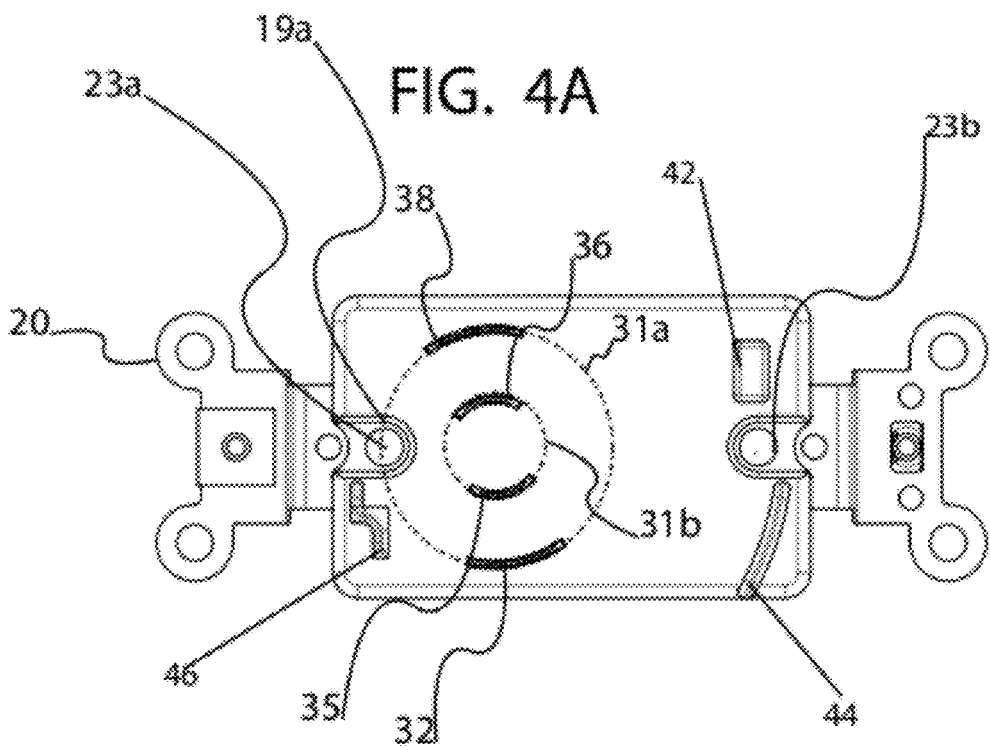
FIG. 4A is a back view of the functional module of FIG. 3A.
Figure 4B:
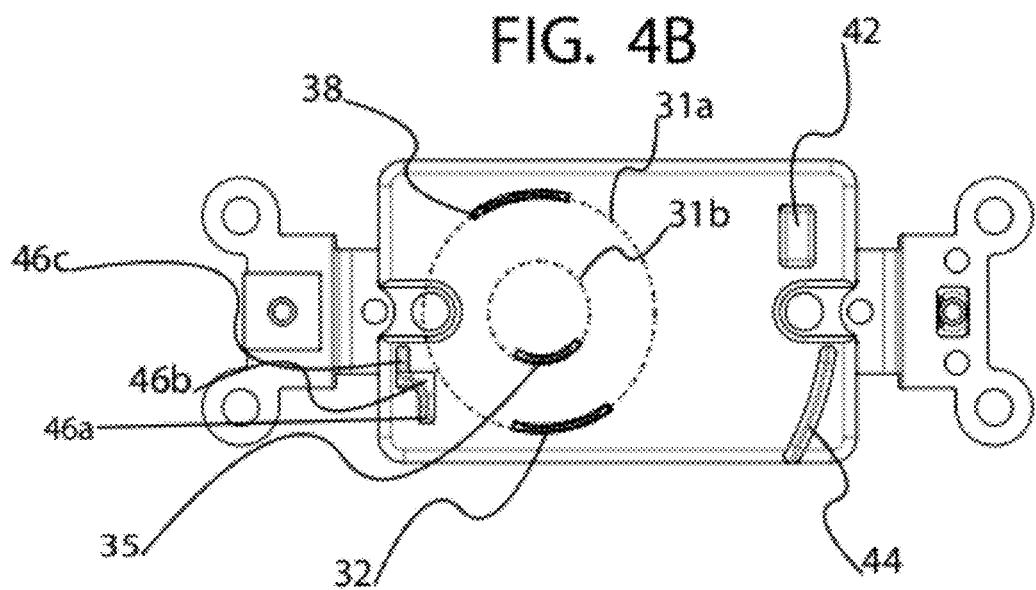
FIG. 4B is a back view of the functional module of FIG. 3B.

FIGS. 4A and 4B show a back view of the embodiments in FIGS. 3A and 3B. These views show the concentric reference circles 31*a* and 31*b*, with reference circle 31*a* being formed concentric with reference circle 31*b*, and form an outline for blades 32, 34, 36 and 38. Because these blades 32, 34, 36 and 38 are formed or aligned based upon these concentric reference circles 31*a* and 31*b*, the wiring module 100 (see FIG. 5) can rotate about a single central axis.

FIG. 5 is a back perspective exploded view of the modular wiring system which discloses a functional module 5, and a wiring module 100. Wiring module 100 is configured in an exploded view and includes a housing 105 comprising a front housing section 110 and a back housing section 140. Disposed inside of housing 105 are lines or wires 130 which each include line contacts 132, 134, 136 and 138. Coupled to each of these line contacts 132, 134, 136, and 138 are respective lines or wires 133, 135, 137, and 139. Each of these contacts 132, 134, 136 and 138 are formed substantially identical to each other.

FIG. 6A shows a first perspective side view of any one of contacts 132, 134, 136 and 138 while FIG. 6B shows an opposite perspective side view of these contacts. Each contact contains a first section 132.1 for receiving a blade, and a second section 132.2 for crimping onto a wire. First section 132.1 includes a substantially curved blade section 132.3 having an opening or a hole 132.5 disposed therein. Positioned opposite or substantially opposite of curved blade section 132.3 is a substantially flat section 132.4 having an indentation 132.6. Indentation 132.6 is formed to accommodate blades of differing thicknesses. For example, if thinner blades are being used, indentation 132.6 can be made more prominent. Alternatively, if thicker blades are used then indentation 132.6 can be made less prominent to accommodate a blade of a larger thickness. Thus, these coupling contacts 132 can be made with varying sized openings by only controlling the level of the indent 132.6 that is stamped. FIG. 6B shows an opposite side of the same contact 132 with opening or hole 132.7 positioned therein, which allows the contact to be coupled to housing 120 via any one of coupling posts 111*b*, 113*b*, 115*b*, and 117*b* (see FIG. 6C).

FIG. 6C shows a back perspective view of front housing section 110 which includes channels 111, 113, 115, and 117. These channels are formed by interior walls 111*a*, 113*a*, and 117*a*. In addition, there are a plurality of blade openings 114, 116, 118 and 119 (FIG. 6D), which are shown formed in front face 110*a*. Accordingly, these blade openings are formed around concentric or substantially concentric reference circles 110*b* and 110*c*. Reference circle 110*b* is formed concentric with reference circle 110*c* so that these blade openings allow blades 32, 34, 36, and 38 to rotate about these reference circles to form a positive lock. Accordingly, because these reference circles are only being shown as a point of reference, they are shown in dashed-dotted lines. Disposed inside of channels 111, 113, 115 and 117 are coupling posts 111*b* 113*b*, 115*b* and 117*b*, which are configured to connect to contacts 132, 134, 136 and 138.

There is also a movable or flexible arm 120 which has a first end 120*a* and a second end 120*b*. The first end 120*a* of movable arm 120 extends from housing 110 and the second end 120*b* of movable arm 120 is an open free end. As an example, movable arm 120 having a first end 120*a* can be molded integral with housing 110, which forms a natural or leaf spring or live spring, while the distal second end 120*b* is free to move. An expanded section 120*c* is also associated with movable arm 120 and forms a rim or flange. This expanded section 120*c* is configured to extend above a back rim of a functional module housing body. In this way, if a user wanted to release wiring module 100 from functional module 5, the user could simply press on expanded section 120*c* driving expanded section 120*c* into gap region 124 thereby allowing the wiring module 100 to move or counter rotate. Disposed the housing, opposite of the movable arm 120, is a connecting flange 129 which includes a stop 129*a*, wherein connecting flange 129 is configured to interact or mesh with connection element 42, by sliding under connection element overhang 42*b*.

FIGS. 7A and 7B show additional back plate 140 which has an inner side 141 and which has a series of gaps or indents 142, 143, 144 and 145 to accommodate different elements associated with the wiring module. For example, gap or indent 142 is for receiving contact end 132.1. Gap or opening 143 is for receiving associated walls 161*a* and 165*a* which are disposed on an opposite front body section 110. An additional opening or recess 145 is configured to receive a portion of wall 113*a* as well. In addition, there are a plurality of openings or recesses 146 for receiving wires into the interior of the body. The opposite face 147 of back section 140 serves as an outer face.

Figure 7E:
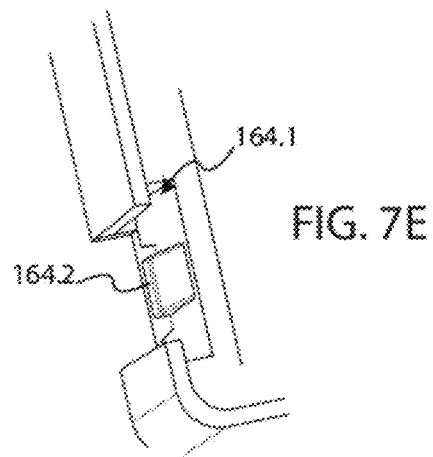
FIG. 7E is a close-up sectional view taken from section A in FIG. 7D.

FIGS. 7C and 7D are alternative embodiments, wherein the back section 150 of a wiring module includes gaps or indents 151a, 151b, 151c and 151d which are box shaped indents and configured to receive the coupling section 132.1 of contacts 132, 134, 136 and 138. In addition, there are elongated indents 152a and 152b which are configured to receive corresponding walls 161a, or 165a. Furthermore, there is a corresponding elongated indent 153 which is configured to receive wall 163a. There is also an indent 154 which is configured to receive the coupling arm 120, and a plurality of retention or snap posts 154a, 154b, 154c, 154d, 154e and 155. These snap posts 154a, 154b, 154c, 154d, 154e and 155 snap into corresponding recesses 164a, 164b, 164c, 164d, 164e and 164f forming a snap fit connection. Each recess, such as recess 164a, includes a guide channel 164.1 and a corresponding snap in flange 164.2 as shown in FIG. 7E. Thus, when a corresponding cover such as back section 150 is coupled into front cover 160, it forms a retention fit connection, thereby resulting in a semi-permanent coupling of the two housings. This back section 150 can also include channel openings 156 for receiving corresponding wires or lines 130.

Front cover 160 includes channels 161, 163, 165 and 167 which are each configured to receive corresponding contacts such as contacts 132, 134, 136 and 138. In addition, these channels are formed by corresponding walls 161a, 163a, and 165a. These walls are configured to divide these channels into different channels. In addition, disposed inside of each of these channels are fixing posts 161b, 163b, 165b, and 167c. These fixing posts are configured to allow contacts such as contacts 132, 134, 136 and 138 to be fixed inside of each of these channels.

In addition, adjacent to channel 167 at an end opposite movable arm 120, there is a connecting flange 167a, including a stop 167b which is configured to intermesh or interconnect with flange or overhang 42b to form a secure connection.

Figure 8:
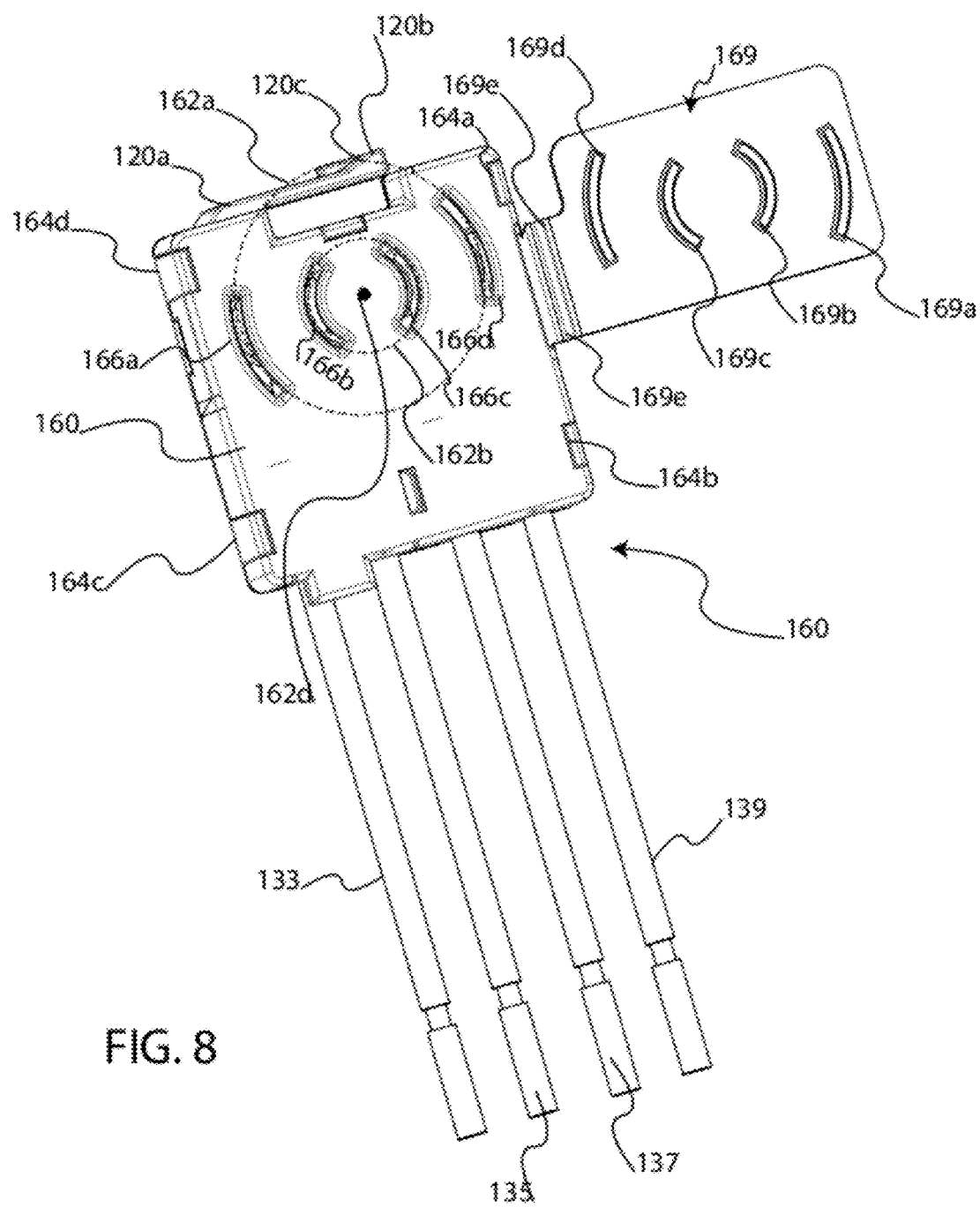
FIG. 8 is a perspective front face view of an assembled wiring module having a cover.
Figure 9A:
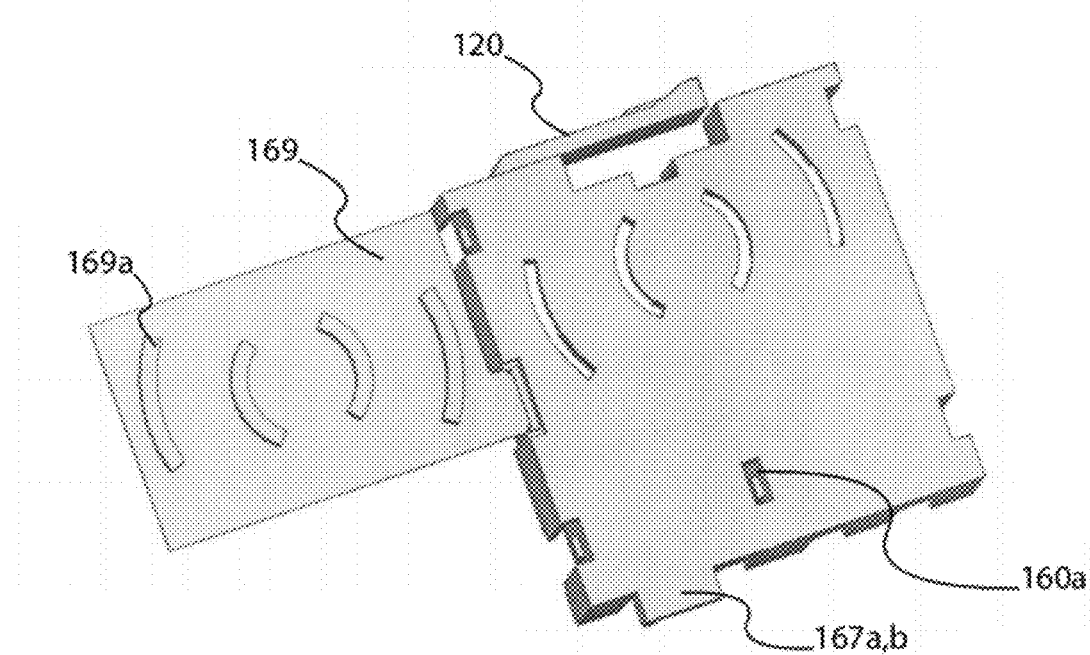
FIG. 9A is an alternative front perspective view of the wiring module in unassembled form.
Figure 9B:
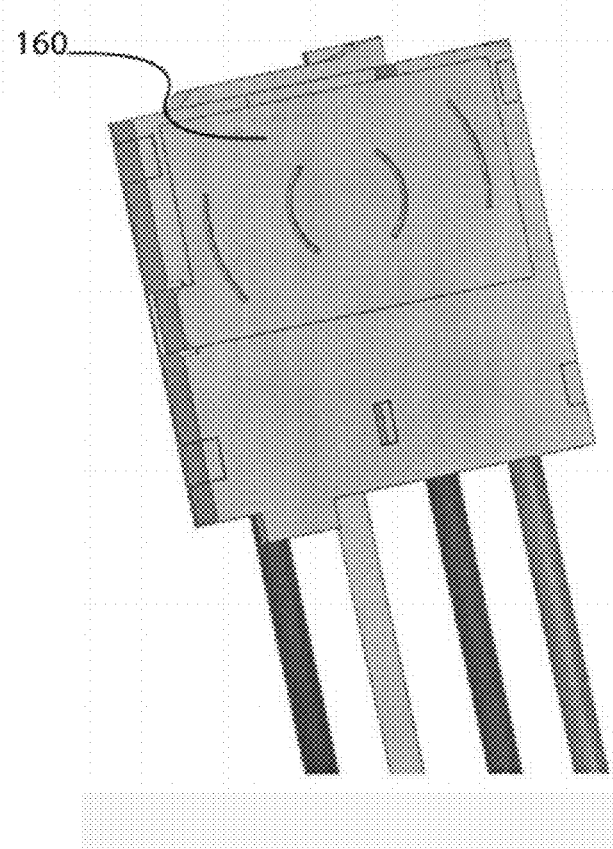
FIG. 9B is a front perspective view of the wiring module with a front cover in a closed position.

FIG. 8 is a front view of a front cover 160 of a wiring module which includes arm 120 having first coupling end 120a, distal second end 120b, and expanded section 120c. In addition, there are arcuate openings 166a, 166b, 166c, 166d, which are each for receiving arcuate blades that are inserted therein, such as arcuate blades 32, 34, 36, and 38. As described above, the arcuate openings 166a, 166b, 166c, and 166d are each formed around concentric reference circles 162a, and 162b which are shown with dashed-dotted lines serving as reference points. Each of the contacts, such as contacts 132, 134, 136 and 138, is coupled to an associated power distribution line such as lines 133, 135, 137, and 139. Each of these lines 133, 135, 137, and 139 is connectable to a power source. In addition, recesses 164a, 164b, 164c, and 164d are disposed inside of front cover 160. Cover 169, which is essentially a shielding cover or dust cover, is shown connected to front cover 160 via a living hinge 169e. There are also arcuate insertion elements or sections 169a, 169b, 169c, and 169d which fit corresponding arcuate openings 166a, 166b, 166c 166d to form a closed or sealed cover as shown in FIG. 9B. FIG. 9A shows a three dimensional drawing version of this design as well, which shows an indent 160a that corresponds to snap post 155.

FIG. 10A shows a first position for wiring device 100 which is positioned in a first connecting position prior to rotation. In this position, arcuate blades 32, 34, 36, and 38 are configured to insert into corresponding contacts 132, 134, 136, and 138. In addition, body 105 is configured in a pre-rotation orientation wherein there is an arcuate guide post 44 which is configured to guide a corner of body 105 around this arcuate shape so that body 105 can be rotated into its final position. In addition, in this view and in this position, there is shown connecting flange 167a having stop 167b positioned to the right of connection element 42. At an opposite end of this wiring module 100, there is movable arm 120. Movable arm 120 is positioned below post 46 so that movable arm 120 is configured to move or rotate on its own flexible hinge or living hinge such that during rotation this movable arm moves into recess region 124 to allow the wiring device 100 to continue to rotate.

Figure 10C:
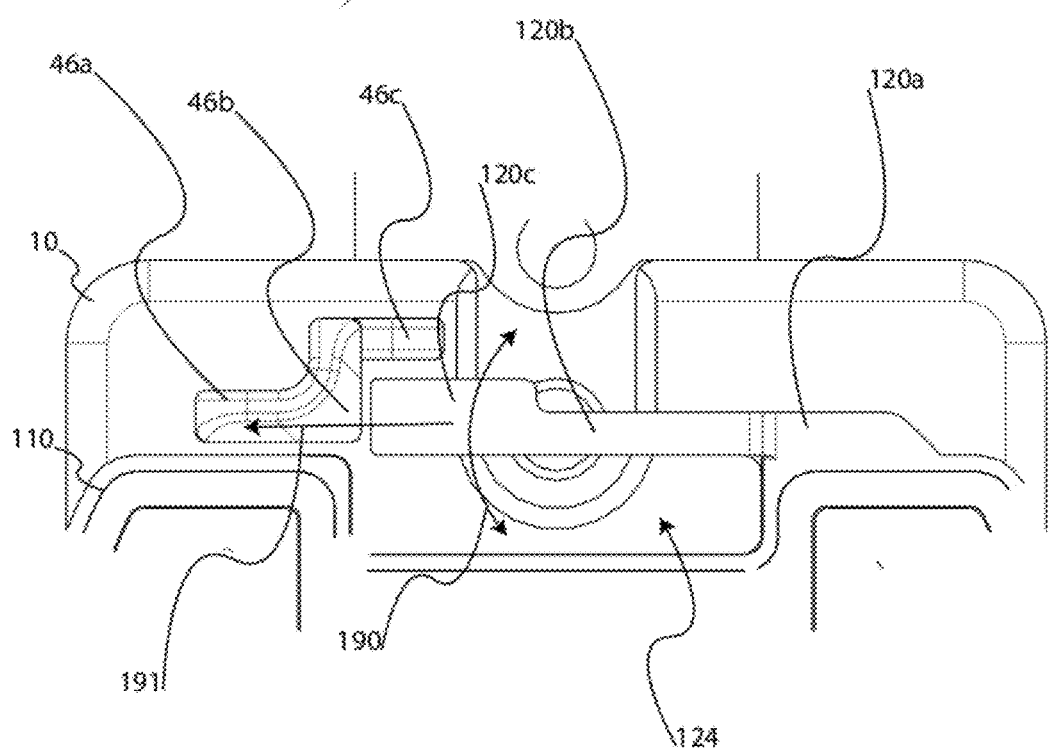
FIG. 10C is a close-up sectional view taken from section B in FIG. 10B.

FIG. 10B shows the wiring device in its rotated position. In this position, each of the arcuate blades 32, 34, 36, and 38 is moved into a contact position with associated contacts 132, 134, 136, and 138, and this contact position results in both sides of the blade being in electrical contact with the contact. In this position, connecting flange 167a is moved into connecting position with connection element 42 such that connecting flange 167a intermeshes with connection element 42 by inserting between overhang 42b and body section 10 of the functional device. In addition, in this position the corner region of body 10 has also rotated past arcuate guide 44. Furthermore, movable arm 120 has moved around post 46 such that movable arm 120 has rotated along rotation axis 190 (See FIG. 10C) and is stopped from moving counter clockwise in a direction of arrow 191 because it is stopped by stop element 46b. Movable arm 120 is also stopped from further rotation in a bending movement along rotational axis 190 away from gap 124 via rotation stop 46c. However, in this position, extension section 120c extends up a sufficient distance to allow a user to push on the distal second end 120b of movable arm 120 to push movable arm 120 into gap or open region 124 so that the wiring device can be selectively rotated back to an unlocked position, by rotating wiring device 100 in a counter clockwise manner.

While the above embodiment has been described as being able to rotate in a clockwise manner from an unlocked position to a locked position, it is possible and within the spirit and scope of this disclosure to create an opposite design wherein the device can be rotated in a counter clockwise manner from an unlocked position to a locked position as well.

FIG. 11A is a back view of another embodiment of a functional module having an additional arcuate blade. This additional functional module 6 includes an additional arcuate blade 37. Therefore, the different blades can be used for connection of two different sets of wiring as well as a ground line. For example, blades 32 and 38 can be configured to connect to power input lines such as a line side phase line and a line side neutral line. Blade 34 is a ground blade for connection to a ground line, while blades 36 and 37 can be configured to connect to a different set of downstream lines such as a load side phase line and a load side neutral line. In this way if the functional module is configured as a ground fault circuit interrupter, the electrical energy provided to the functional module from the connection of blades 32 and 38 to power distribution lines can then be selectively disconnected from the output electrical energy provided by blades 36 and 37. Therefore, when contacts such as bridged contacts are connected, power can be passed from blades 32 and 38 to blades 36 and 37 and then to corresponding contacts inside an associated wiring module and then to downstream lines which are coupled to the wiring module. These downstream lines can then be coupled to a downstream distribution line to provide power to another downstream load such as another functional module. These arcuate blades are arranged concentrically with respect to each other without a central ground pin. For example, a first set of arcuate blades 32 and 38 are arranged around a first reference circle 31a, a second set of arcuate blades 34 and 36 are arranged around a second reference circle 31b, and a third set of arcuate blades 37 is arranged around another arcuate reference circle 31c. Each of these reference circles 31a, 31b and 31c are arranged concentric with relation to each other and each of these reference circles are shown in dashed dotted lines to show that while there are no actual physical circles, the associated blades are in at least this embodiment, arranged concentric around these reference circles.

FIG. 11B is a front view of a wiring module 260 which includes five arcuate blade openings. Blade openings 166a and 166d are configured to receive blades 32 and 38, while blade openings 166b and 166c are configured to receive blades 34 and 36, while blade opening 166e is configured to receive blade 37. Furthermore, a fifth line 135a extends out from this wiring module so that lines 133 and 139 form power distribution lines providing power to contacts associated with openings 166a and 166d, while lines 135a and 137 are associated with the contacts associated with openings 166b and 166c, forming power load lines for coupling to a line associated with a downstream load, while line 135 is associated with the opening 166e forming a ground line for connection to a ground. There is also an additional insertion element 169f to cover over the additional opening 166e. Each of these blade openings are arranged in concentrically arranged sets based upon concentric reference circles. For example, openings 166a and 166d are arranged around a first reference circle 161a, openings 166b and 166c are arranged around another reference circle 162b, while opening 166e is arranged around another reference circle 161c. Each of these reference circles 162a, 162b, and 162c are concentric with each other around a central axis 162d. These reference circles are shown in dashed dotted lines because they do not physically exist, but rather serve as a guide showing how each of the sets of openings is arranged.

Figure 12A:
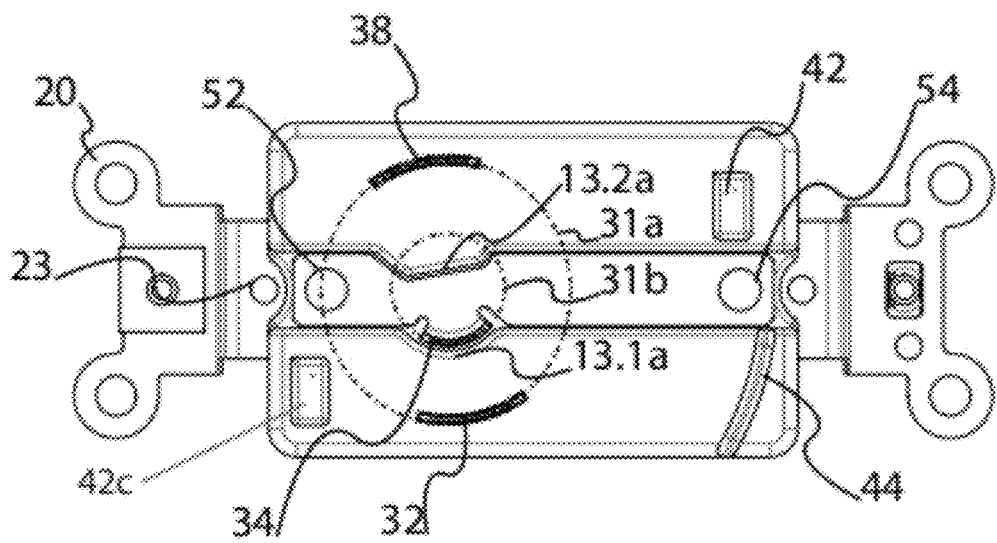
FIG. 12A is a back view of another embodiment of a functional module having a movable arm.

FIG. 12A is a back view of another embodiment of a functional module having a movable arm. In this embodiment, there is a simple movable arm 42c which is movable when an associated wiring module is rotated from an unsecured position to a secured position.

Figure 12B:
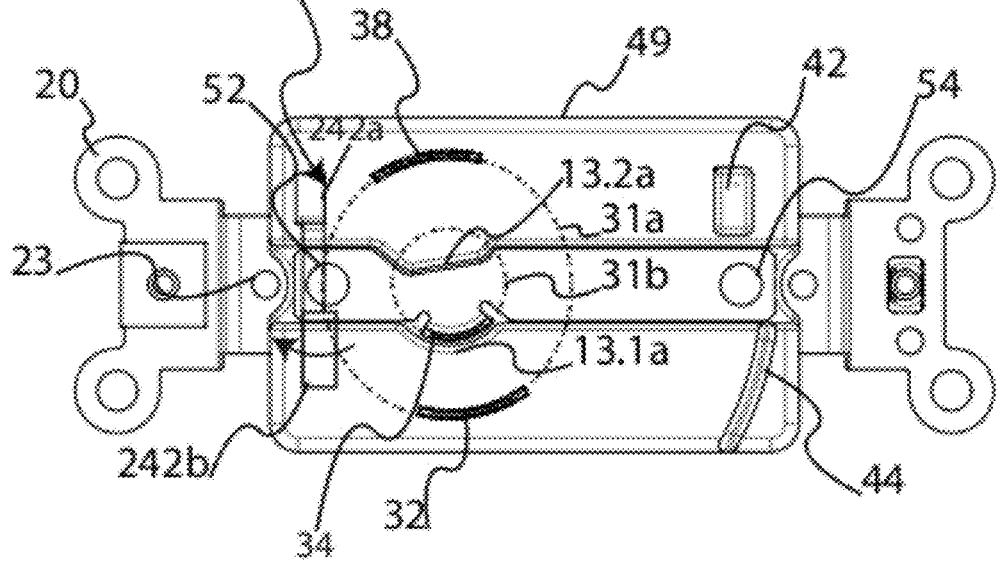
FIG. 12B is a back view of another embodiment of a functional module having a movable arm.

FIG. 12B is a back view of another embodiment of a functional module having a movable arm. In this view there is an arm 242 which has a first fixed end 242a which is coupled to housing 49 at a first end, and which has a free opposite end. This free opposite end 242b is configured to move when an associated wiring module is rotated from an unconnected or unsecured position to a secured position such as shown in FIGS. 10A and 10B. Expanded section 242c of arm 242 forms a flange which forms a securing device or lock to secure the wiring module against rotation back to an unsecured state.

Accordingly, while at least one embodiment of the present invention has been shown and described, it is to be understood that many changes and modifications may be made thereunto without departing from the spirit and scope of the invention as defined in the appended claims.

What is claimed is:

1. An electrical device comprising:
a functional module comprising:
a housing having a front face, and a back face;
a strap coupled to said housing, said strap configured to engage a wall box;
at least four arcuate blades extending out from said back face of said housing wherein at least one of said at least four arcuate blades has a locking section, and wherein at least one of said at least four arcuate blades is electrically coupled to an electrical ground; and
wherein said at least four arcuate blades comprise a first set of blades comprising at least two arcuate blades arranged along a first reference circle, and a second set of blades comprising at least two arcuate blades arranged along a second reference circle.

2. The electrical device as in claim 1, wherein said arcuate blade that is coupled to an electrical ground is disposed offset from a central position of said back face of said housing.

3. The electrical device as in claim 2, wherein said wallbox is a single gang enclosure.

4. The electrical device as in claim 1, wherein at least one of said at least four arcuate blades is electrically coupled to said strap.

5. The electrical device as in claim 1, wherein at least one of said at least four arcuate blades is L-shaped.

6. The electrical device as in claim 1, further comprising at least one plate coupled to said back face of said housing, wherein at least one of said at least four arcuate blades is coupled to said at least one plate on said back face.

7. The electrical device as in claim 6, wherein said at least one plate and at least one of said at least four arcuate blades are formed in one piece.

8. The electrical device as in claim 6, wherein said at least one plate is a ground.

9. The electrical device as in claim 1, further comprising at least one non-conductive coupling element, configured to couple said housing to another object.

10. The electrical device as in claim 9, wherein said non-conductive coupling element comprises a flange extending out from said back face of said functional module.

11. The electrical device as in claim 1, further comprising a guide coupled to said housing, said guide configured to guide another object to connect to said housing in a rotational manner.

12. A wiring system comprising:
a functional module comprising:
a housing having a front face and a back face; and
at least four arcuate blades extending out from said back face of said housing, wherein at least one of said at least four arcuate blades has a locking section;
wherein said plurality of blades comprise a first set of blades comprising at least two arcuate blades arranged along a first reference circle, and a second set of blades comprising at least two arcuate blades arranged along a second reference circle;
a strap coupled to said housing, said strap configured to engage a wall box; and
at least one wiring module comprising:
a housing having a front face and a back face; and
at least one opening for receiving at least one of said at least three arcuate blades.

13. The wiring system as in claim 12, wherein said at least one wiring module further comprises at least one flexible arm which is configured to flex when said functional module is coupled to said wiring module.

14. The wiring system as in claim 12, wherein said at least one flexible arm is attached at a first end to said housing and is free at an opposite end.

15. The wiring system as in claim 12, wherein said wiring module housing further comprises at least one coupling element.

16. The wiring system as in claim 13, wherein said wiring module housing further comprises at least one coupling element, wherein said at least one coupling element is disposed on a side opposite said at least one flexible arm.

17. The wiring system as in claim 16, wherein said at least one coupling element is configured to stop said wiring module from rotation relative to said functional module in a first direction, or to stop said functional module from rotation relative to said wiring module in said first direction, and said at least one movable arm is configured to stop said wiring module from rotation relative to said functional module in an opposite direction to said first direction or to stop said functional module from rotation relative to said wiring module in said opposite direction.

18. A functional module comprising:
   a) a housing; and
   b) a plurality of arcuate blades extending out from said housing and comprising at least one first blade configured to receive power from a power distribution line and at least one second blade configured to pass power to a load line wherein the housing does not include a central ground pin;
   wherein said plurality of arcuate blades comprise a first set of blades comprising at least two arcuate blades arranged along a first reference circle, and a second set of blades comprising at least two arcuate blades arranged along a second reference circle.

19. The functional module as in claim 18, further comprising at least one circuit interrupter, said at least one circuit interrupter being configured to disconnect power from said first blade to said second blade.

20. The functional module as in claim 19, wherein said circuit interrupter is a ground fault circuit interrupter.

21. The functional module as in claim 19, wherein said circuit interrupter is an arc fault circuit interrupter.

22. A functional module comprising:
   a) a housing; and
   b) a plurality of blades extending out from said housing and comprising at least one first blade configured to receive power from a power distribution line and at least one second blade configured to pass power to a load line, wherein said plurality of blades comprise a set of at least two concentrically inside blades and at least two concentrically outside blades.

23. The functional module as in claim 22, wherein said set of at least two concentrically inside blades comprise at least two arcuate blades arranged along a first reference circle, and said at least two concentrically outside blades comprise a second set of blades comprising at least two arcuate blades arranged along a second reference circle.

* * * * *